(12) United States Patent
Joul

(10) Patent No.: US 10,404,655 B2
(45) Date of Patent: Sep. 3, 2019

(54) IP INDEX FOR IP ADDRESS ALLOCATION BASED ON POLICY CONTROL FUNCTION

(71) Applicant: T-Mobile USA, Inc., Bellevue, WA (US)

(72) Inventor: Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 35 days.

(21) Appl. No.: 15/648,932

(22) Filed: Jul. 13, 2017

(65) Prior Publication Data

US 2018/0227267 A1    Aug. 9, 2018

Related U.S. Application Data

(60) Provisional application No. 62/454,498, filed on Feb. 3, 2017.

(51) Int. Cl.
| | | |
|---|---|---|
| *H04L 29/12* | (2006.01) | |
| *H04L 12/14* | (2006.01) | |
| *H04M 15/00* | (2006.01) | |
| *H04W 4/24* | (2018.01) | |
| *H04W 88/16* | (2009.01) | |

(52) U.S. Cl.
CPC ...... *H04L 61/2061* (2013.01); *H04L 12/1407* (2013.01); *H04L 61/2015* (2013.01); *H04M 15/56* (2013.01); *H04M 15/66* (2013.01); *H04W 4/24* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 7,152,117 B1* | 12/2006 | Stapp | ................ | H04L 29/12273 709/245 |
| 2009/0061869 A1* | 3/2009 | Bui | ................... | H04L 29/12283 455/435.1 |
| 2011/0302289 A1 | 12/2011 | Shaikh et al. | | |
| 2012/0042058 A1* | 2/2012 | Shaikh | ............. | H04L 29/12188 709/222 |

(Continued)

FOREIGN PATENT DOCUMENTS

WO    WO2013000850 A1    1/2013

OTHER PUBLICATIONS

3GPP (TM), "3rd Generation Partnership Project; Technical Specification Group Services and System Aspects; Procedures for the 5G System; Stage 2; (Release 15)," 3GPP TS 23.502 V0.1.1 (Jan. 2017), (c) 2017, 46 pages.

(Continued)

*Primary Examiner* — Phirin Sam
*Assistant Examiner* — Sori A Aga
(74) *Attorney, Agent, or Firm* — Lee & Hayes, P.C.

(57) ABSTRACT

Systems and methods discussed herein are directed to allocating an IP address to a requesting UE based on an IP index as a part of a policy rule, such as a policy and charging control (PCC) rule from a policy control function (PCF) of a communication network. The IP index may be one of a plurality of IP indices each of which specifies a different pool of IP addresses compatible with a different service associated with the UE.

20 Claims, 3 Drawing Sheets

(56) References Cited

U.S. PATENT DOCUMENTS

2015/0382386 A1  12/2015  Castro Castro et al.
2016/0316069 A1  10/2016  Siedelhofer et al.

OTHER PUBLICATIONS

3GPP(TM), "3rd Generation Partnership Project; Technical Specification Group Services and System Aspects; System Architecture for the 5G System; Stage 2 (Release 15)," 3GPP TS 23.501 V0.1.1 (Jan. 2017) (c) 2017, 67 pages.

PCT Search Report and Written Opinion dated May 4, 2018 for PCT Application No. PCT/US18/15399, 11 pages.

* cited by examiner

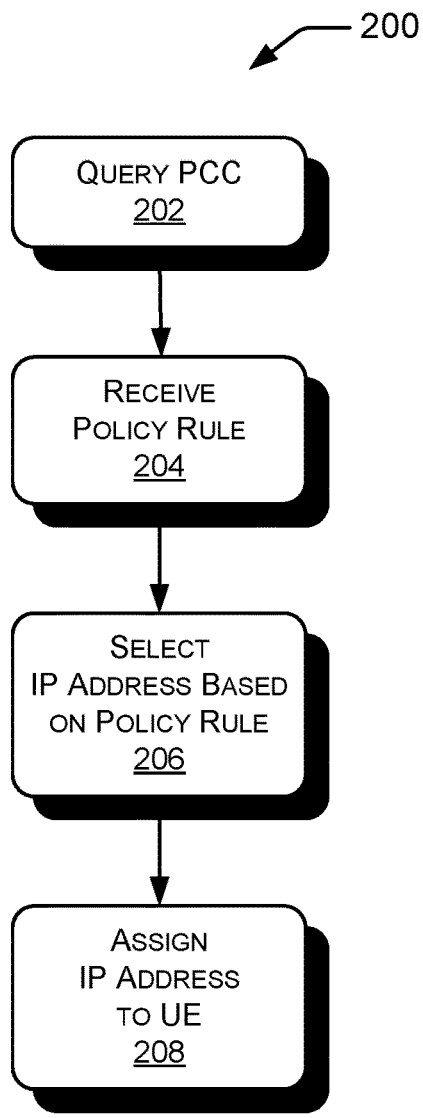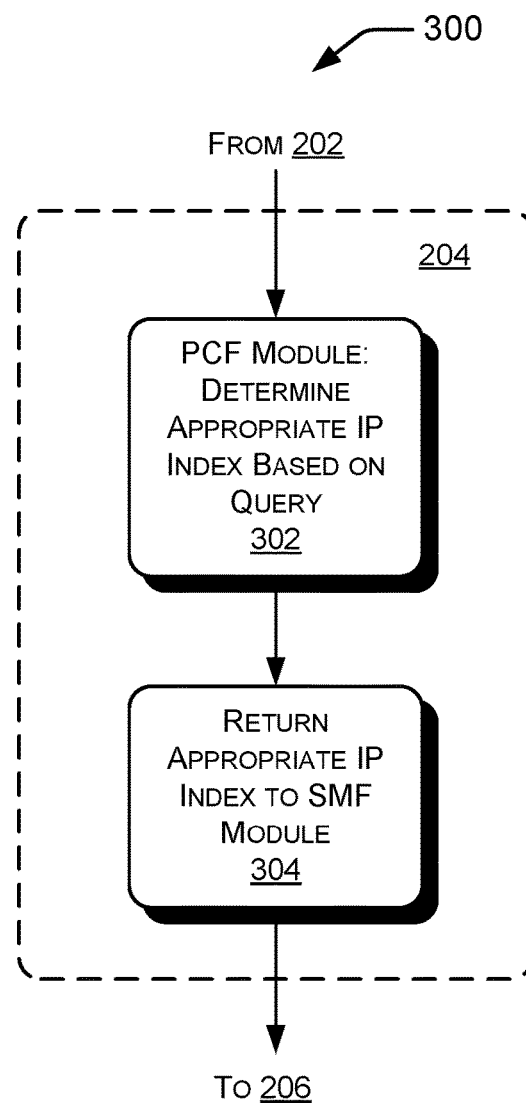
FIG. 2
FIG. 3

IP INDEX FOR IP ADDRESS ALLOCATION BASED ON POLICY CONTROL FUNCTION

CROSS-REFERENCE TO RELATED APPLICATIONS

This application is a non-provisional of, and claims priority to and the benefit of, U.S. Provisional Patent Application Ser. No. 62/454,498, filed Feb. 3, 2017 and entitled "IP ADDRESS ALLOCTION IN 5G NETWORKS" the entirety of which is incorporated herein by reference.

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Some of mobile devices operating in such telecommunication systems are also capable of operating over Wi-Fi networks for voice, also known as Voice-over-IP (VoIP) and data.

In the LTE network with the Evolved Packet Core (EPC), when a bearer is created for a user equipment (UE) requesting for a service, the 3GPP standard specifies that a Public Data Network (PDN) Gateway (PGW) immediately allocates an Internet Protocol (IP) address for the UE to use for the bearer. While the 3GPP standard does not specify how the PGW determines which IP address to allocate, often a simple method of allocating the next available address is used. While this allocation method was satisfactory for the originally foreseen LTE services, it is already straining with the growth in variety of LTE services. With the expansion of use cases, devices, and services already determined for 5G networks, the current simple method is expected to be inadequate to meet the expected growth.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example process for allocating an IP address to a UE.

FIG. 3 illustrates an example process detailing one of the blocks of FIG. 2.

DETAILED DESCRIPTION

Systems and methods discussed herein are directed to allocating an IP address to a requesting UE based on an IP index as a part of a policy rule, such as a policy and charging control (PCC) rule from a policy control function (PCF) of a communication network. The UE may be a cellular telephone, tablet computer, desktop or laptop personal computer, or any other device requesting a network service and requiring an IP address assignment. To address a variety of use cases, a session manager, such as a session management function (SMF), of the communication network may support multiple IP allocation methods, such as a support for multiple pools, interfaces to non-3GPP databases, roaming interfaces to a Home Public Land Mobile Network (HPLMN), and the like. Additionally, while creating a protocol data unit (PDU) for the UE, the SMF may determine which method is appropriate to the PDU.

While it may be possible to hard-code rules into the SMF based on information available to the SMF, such as a range for international mobile subscriber identity (IMSI), it may result in a complex SMF configuration and inflexible services, and may be contrary to centralizing policy rules.

Figure 1:
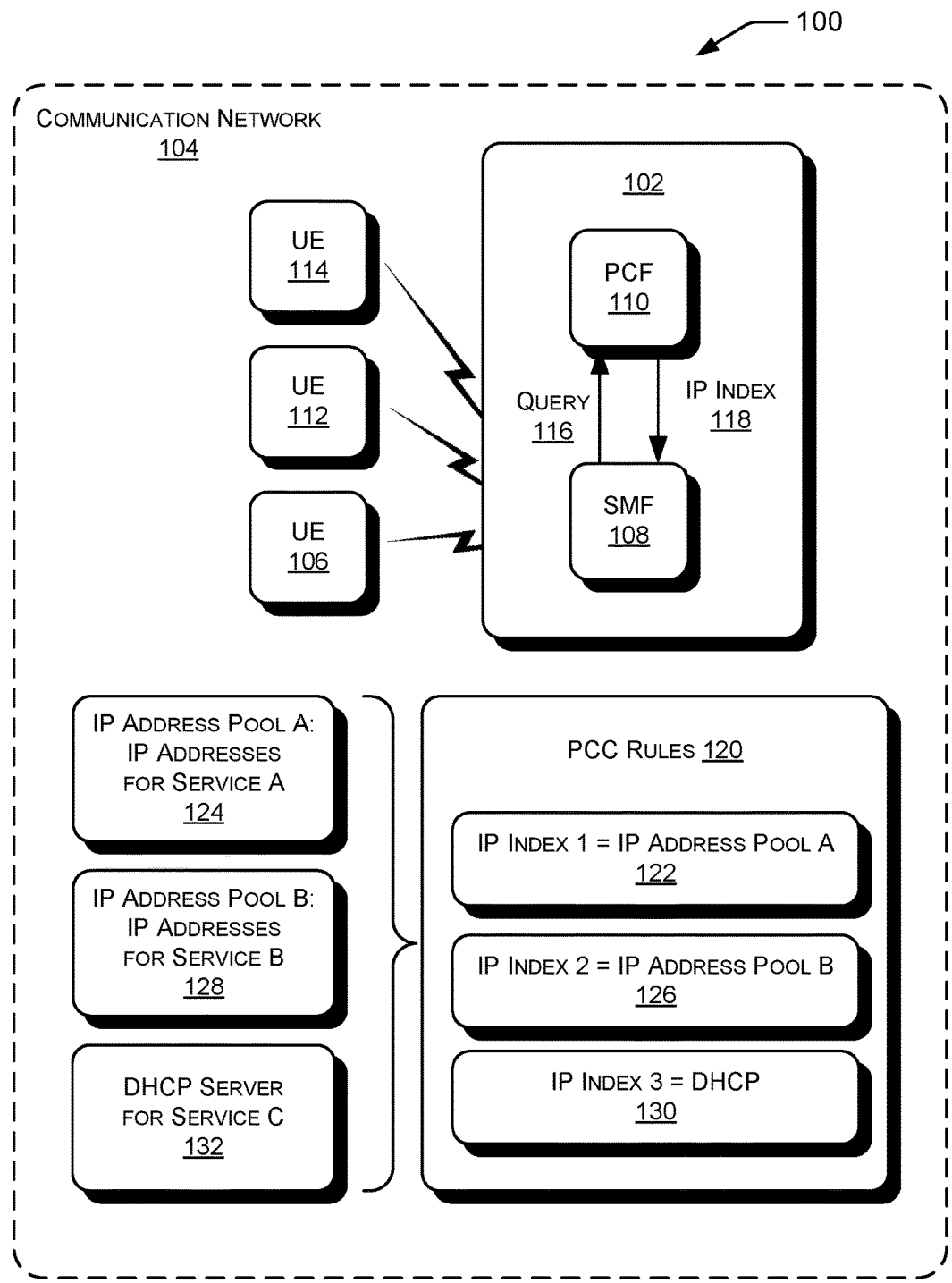
FIG. 1 illustrates an example block diagram of a system with associated components for assigning an IP address to a UE based on a service associated with the UE.

FIG. 1 illustrates an example block diagram 100 of a system 102 in a communication network 104, such as a 4G or 5G telecommunication network, with associated components for assigning an IP address to a UE 106 based on a service associated with the UE 106.

The system 102 comprises a session manager, such as a serving gateway (S-GW) or an SMF module 108, and a policy controller, such as a policy and charging rules function (PCRF) or a policy control function (PCF) module 110. There may be several UEs (three UEs 106, 112, and 114 are shown as an example) in the communication network 104. The UEs 106, 112, and 114 may request or require different services in the communication network 104. During a PDU establishment for the UE 106, the SMF module 108 may send a query 116 regarding the UE 106 to the PCF module 110. In response, the PCF module 110 may return an IP index 118 based on a policy rule such as a PCC rule 120, which may indicate that the UE 106 requests, or requires, a specific service, such as service A, in the communication network 104.

The PCC rule 120 may comprise a plurality of IP indices, each of which specifies a different pool of IP addresses compatible with a different service associated with a requesting UE. For example, IP Index of 1 122 may specify to use the IP address pool 124, which includes IP addresses available for assigning to UEs requesting or requiring the service A, IP Index of 2 126 may specify to use IP address pool 128, which includes IP addresses available for assigning to UEs requesting or requiring the service B, and IP Index of 3 130 may specify to use IP address pool 132, which includes IP addresses generated by a dynamic host configuration protocol (DHCP) server available for assigning IP addresses assigning to UEs requesting or requiring the service C.

In this example, based on the requirement of the UE 106 for the service A, the IP Index of 1 122 for the IP index 118 is returned to the SMF module 108 in response to the query 116. The SMF module 108 may then select an IP address from the IP address pool A 124, and assign the selected IP address to the UE 106. If an invalid or null value for the IP index 118 were returned to the SMF module 108, then the SMF module 108 may use a default IP address assigning process which may be predetermined by the operator of the communication network 104.

FIG. 2 illustrates an example process 200 for allocating an IP address to the UE 106.

In block 202, a session manager, such as the SMF module 108 as illustrated in FIG. 1, may query a policy controller, such as the PCF module 110 as illustrated in FIG. 1, regarding the UE 106. In response, the SMF module 108 may receive an IP index 118 based on a policy rule, such as the PCC rule 120, as described above with reference to FIG. 1, from a policy controller, such as the PCF module 110, in block 204. Based on the IP index 118, the SMF module 108 may select an IP address in block 206, and assign the selected IP address to the UE 106 in block 208.

As described above with reference to FIG. 1, the PCC rule 120 may comprise a plurality of IP indices, each of which specifies a different pool of IP addresses compatible with a different service associated with the UE 106, such as the IP Index of 1 122 specifying the IP address pool 124 for the service A, IP Index of 2 126 specifying the IP address pool 128 for the service B, and IP Index of 3 130 specifying the IP address pool 132 for IP addresses generated by a DHCP server for the service C. The above describe process for allocating an IP address to the UE 106 may be performed during a protocol data unit (PDU) session setup for the UE 106.

FIG. 3 illustrates an example process 300 detailing block 204 of FIG. 2. In response to receiving the query 116, which include information regarding the UE 106, from the SMF module 108, the PCF module 110 determines an appropriate IP Index based on the query 116 in block 302. In block 304, the PCF module 110 returns the appropriate IP Index, in this example IP Index of 1 122, as the IP index 118, to the SMF module 108.

Figure 4:
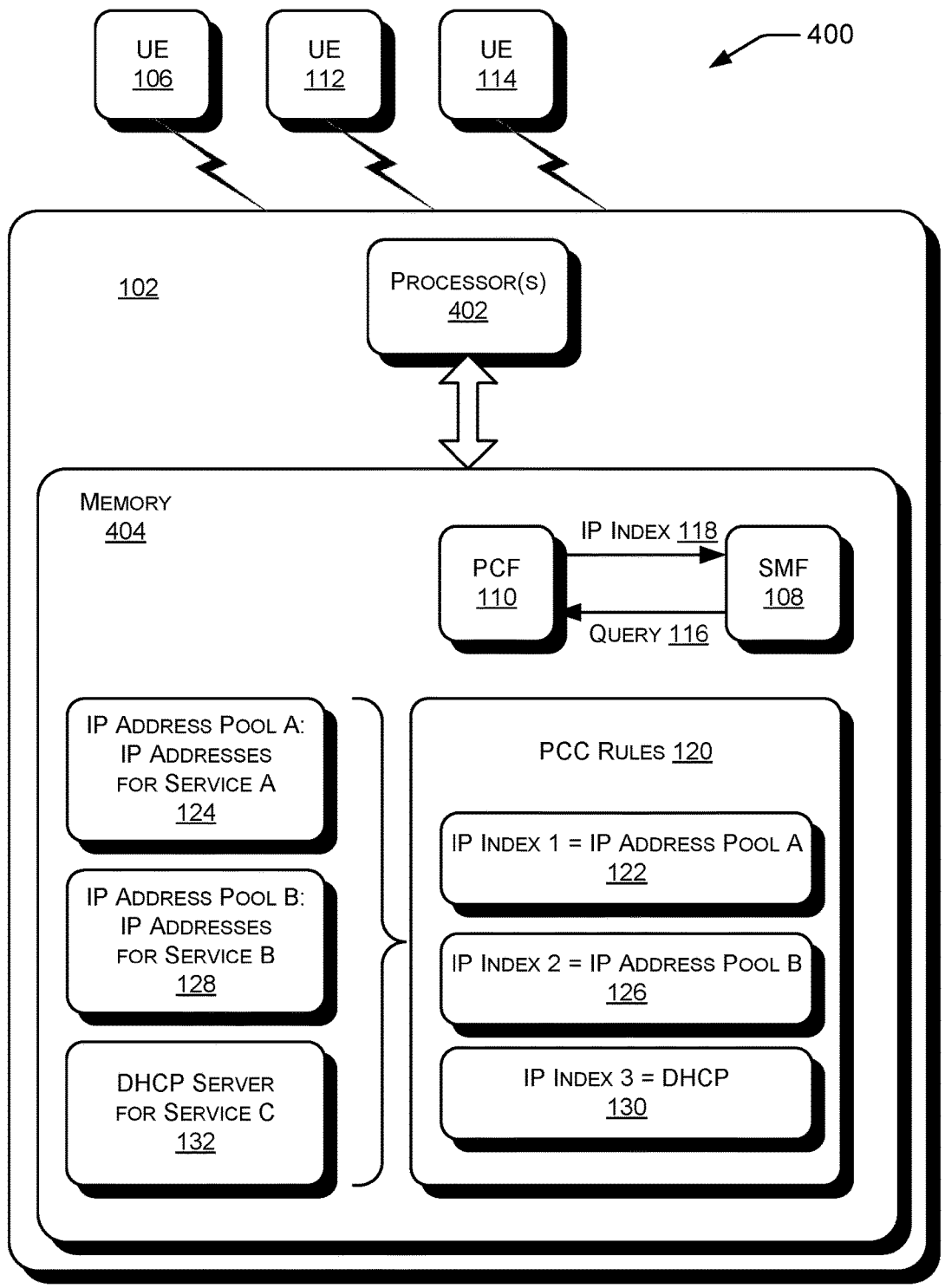
FIG. 4 illustrates an example computer architecture block diagram of the system of FIG. 1.

FIG. 4 illustrates an example computer architecture block diagram 400 of the system 102 of FIG. 1. The system 102 may comprise one or more processors 402 and a memory 404 communicatively coupled to the processors 402. The memory 404 may comprise various software modules such as the SMF module 108, the PCF module 110, the PCC rule 120 including IP indices 122, 126, and 130, and IP address pools 124, 128, and 132, as illustrated in FIG. 1 above. There may be several UEs (three UEs 106, 112, and 114 are shown as an example) in communication with the system 102, each requesting or requiring different services. For example, during a PDU establishment for the UE 106, the processors 402 may instruct the SMF module 108 to send the query 116 regarding the UE 106 to the PCF module 110. In response, the PCF module 110 may return the IP index 118 based on the PCC rule 120. The PCC rule 120 may indicate that the UE 106 requests, or requires, a specific service, such as the service A.

In this example, based on the requirement of the UE 106 for the service A, the IP Index of 1 122 for the IP index 118 is returned to the SMF module 108, indicating that an IP address from the IP address pool A 124 is to be selected for the UE 106. The processors 402, via the SMF 108, may then assign the selected IP address to the UE 106. If an invalid or null value for the IP index 118 were returned to the SMF module 108, then the processors 402, via the SMF module 108, may use a default IP address assigning process which may be predetermined by the operator of the communication network 104.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a session manager of a communication network for allocating an Internet Protocol (IP) address to a user equipment (UE), the method comprising:

sending a query to a policy controller regarding the UE;

receiving an IP index associated with the UE from the policy controller in response to the query;

upon receiving the IP index specifying an IP address pool that includes IP addresses available for assigning to the UE:

selecting an IP address from the IP address pool compatible with a service requested by the UE, and assigning the IP address selected to the UE; and upon receiving one of an invalid value or null value for the IP index from the policy controller in response to the query:

assigning a default IP address based on a predetermined IP assigning process.

2. A method of claim 1, wherein the IP index is based on a policy rule mapping the IP index to the IP address pool having available IP addresses for the UE.

3. A method of claim 2, wherein the policy rule is a policy and charging control (PCC) rule associated with the communication network.

4. A method of claim 2, wherein selecting the IP address based on the IP index comprises:

selecting the IP address from the IP address pool mapped by the IP index.

5. A method of claim 2, wherein the IP index is one of a plurality of IP indices, each IP index of the plurality of IP indices mapping a different pool of IP addresses compatible with a different service associated with the UE.

6. A method of claim 1, wherein the session manager is at least one of:

a serving gateway (S-GW) of the communication network, or a session management function (SMF) of the communication network.

7. A method of claim 1, wherein the policy controller is at least one of:

a policy and charging rules function (PCRF) of the communication network, or a policy control function (PCF) of the communication network.

8. A method of claim 1, wherein the allocation of the IP address to the UE occurs during a protocol data unit (PDU) session setup for the UE.

9. A non-transitory computer storage medium storing computer-readable instructions executable by a computer, that when executed by the computer, cause the computer to perform operations comprising:

sending a query to a policy controller regarding a user equipment (UE);

receiving an IP index associated with the UE from the policy controller in response to the query;

upon receiving the IP index specifying an IP address pool that includes IP addresses available for assigning to the UE:

selecting an IP address from the IP address pool compatible with a service requested by the UE, and assigning the IP address selected to the UE; and upon receiving one of an invalid value or null value for the IP index from the policy controller in response to the query:

assigning a default IP address based on a predetermined IP assigning process.

10. A non-transitory computer storage medium of claim 9, wherein the IP index is based on a policy rule mapping the IP index to the IP address pool having available IP addresses for the UE.

11. A non-transitory computer storage medium of claim 10, wherein the policy rule is a policy and charging control (PCC) rule associated with the communication network.

12. A non-transitory computer storage medium of claim 10, wherein selecting the IP address based on the IP index comprises:

selecting the IP address from the IP address pool mapped by the IP index.

13. A non-transitory computer storage medium of claim 10, wherein the IP index is one of a plurality of IP indices, each IP index of the plurality of IP indices mapping a different pool of IP addresses compatible with a different service associated with the UE.

14. A non-transitory computer storage medium of claim 9, wherein the computer is coupled to a session manager of a communication network, the session manger is at least one of:

a serving gateway (S-GW) of the communication network, or a session management function (SMF) of the communication network.

15. A non-transitory computer storage medium of claim 9, wherein the policy controller is at least one of:

a policy and charging rules function (PCRF) of the communication network, or a policy control function (PCF) of the communication network.

16. A non-transitory computer storage medium of claim 9, wherein assigning the IP address selected to the UE occurs during a protocol data unit (PDU) session setup for the UE.

17. A system in a communication network configured to assign an Internet Protocol (IP) address to a user equipment (UE), the system comprising:

a session management function (SMF) module; and a policy control function (PCF) module communicatively coupled to the SMF, wherein the SMF is configured to:

send a query to the PCF regarding the UE;

receive an IP index associated with the UE from the PCF module in response to the query;

upon receiving the IP index specifying an IP address pool that includes IP addresses available for assigning to the UE:

select an IP address from the IP address pool compatible with a service requested by the UE, and assign the IP address selected to the UE; and upon receiving one of an invalid value or null value for the IP index from the PCF in response to the query:

assign a default IP address based on a predetermined IP assigning process.

18. A system of claim 17, wherein the IP index is based on a policy and charging control (PCC) rule associated with the communication network, the PCC rule mapping the IP index to the IP address pool having available IP addresses for the UE.

19. A system of claim 18, wherein SMF is further configured to select the IP address from the IP address pool mapped by the IP index.

20. A system of claim 18, wherein the IP index is one of a plurality of IP indices, each IP index of the plurality of IP indices mapping a different pool of IP addresses compatible with a different service associated with the UE.

* * * * *